Figure 7:
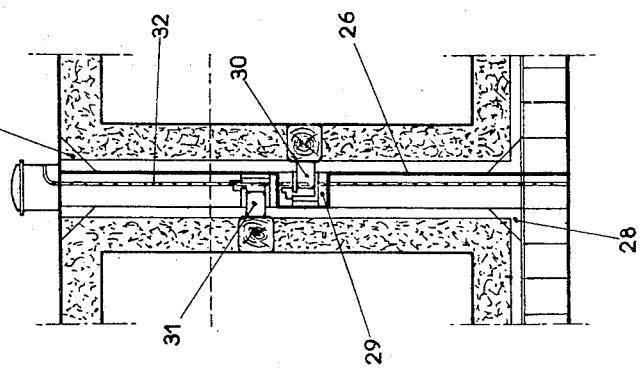

Jan. 1, 1963 R. LEROUX 3,071,094
VESSEL FOR TRANSPORTING LIQUEFIED HYDROCARBONS
Filed Oct. 22, 1959 9 Sheets-Sheet 1

INVENTOR
RENÉ LEROUX
BY
KENWAY, JENNEY, WITTER & HILDRETH
ATTORNEYS

Jan. 1, 1963 R. LEROUX 3,071,094
VESSEL FOR TRANSPORTING LIQUEFIED HYDROCARBONS
Filed Oct. 22, 1959 9 Sheets-Sheet 3

INVENTOR
RENÉ LEROUX
BY
KENWAY, JENNEY, WITTER & HILDRETH
ATTORNEYS

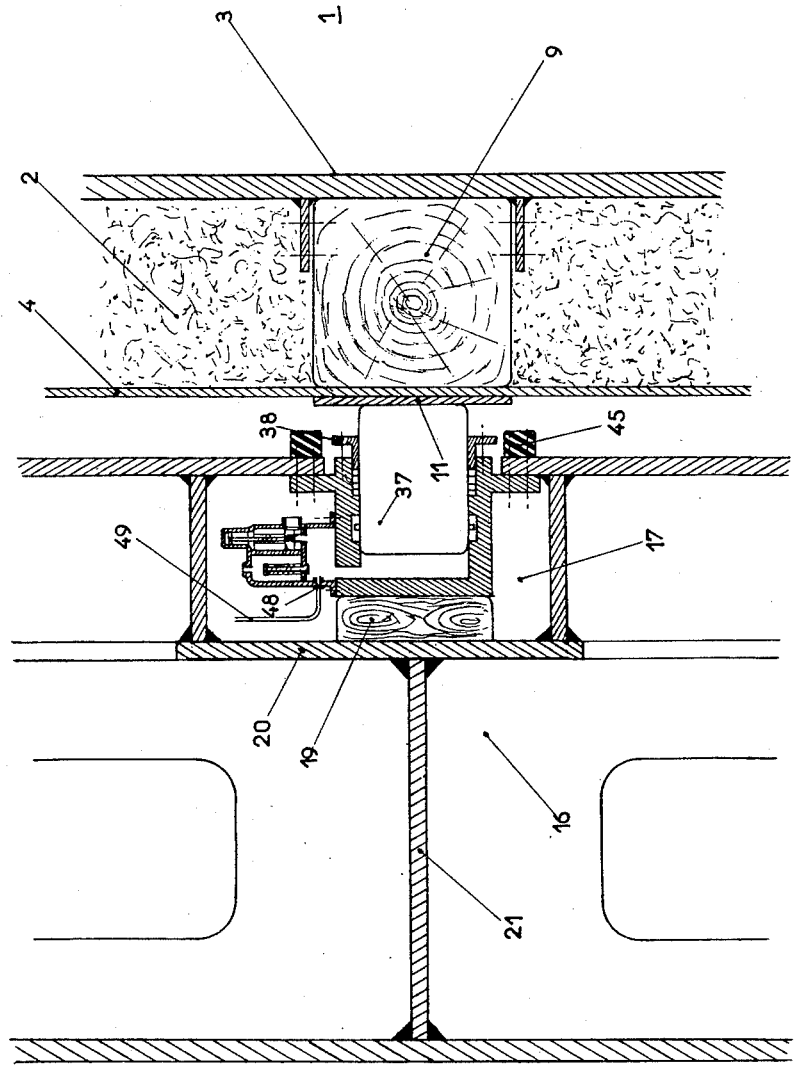

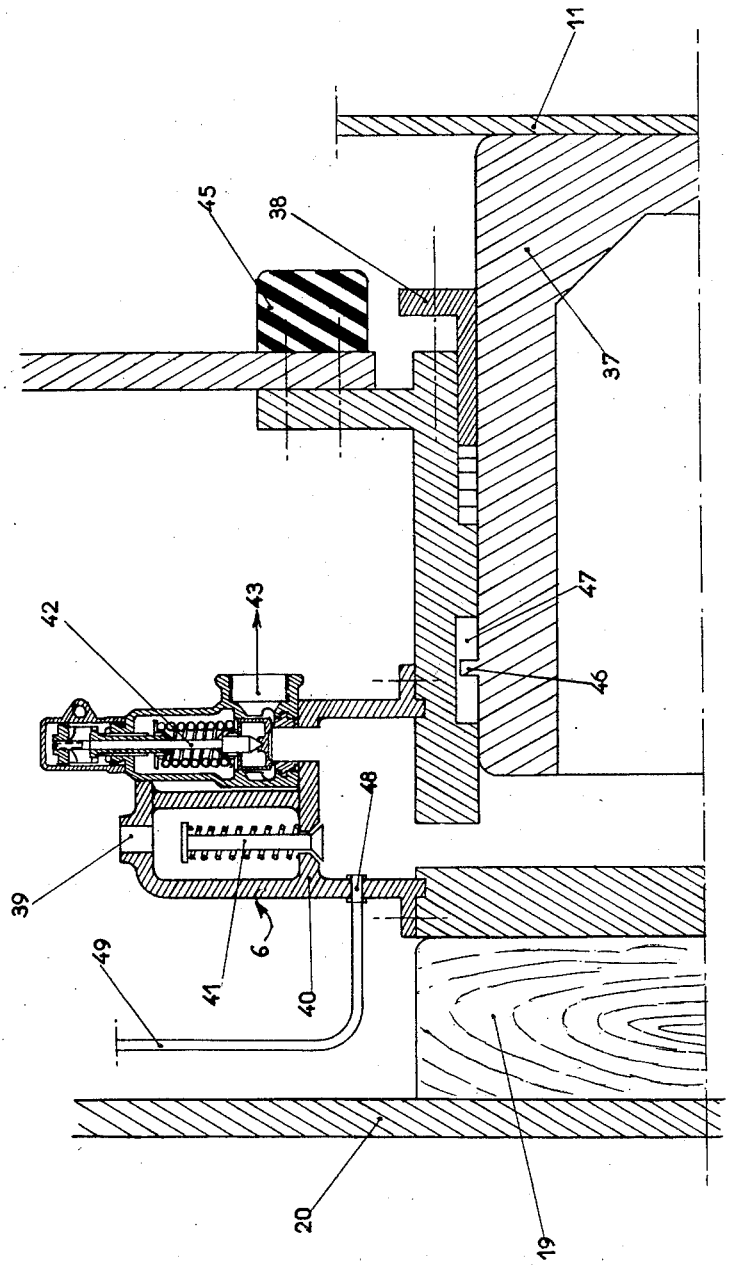

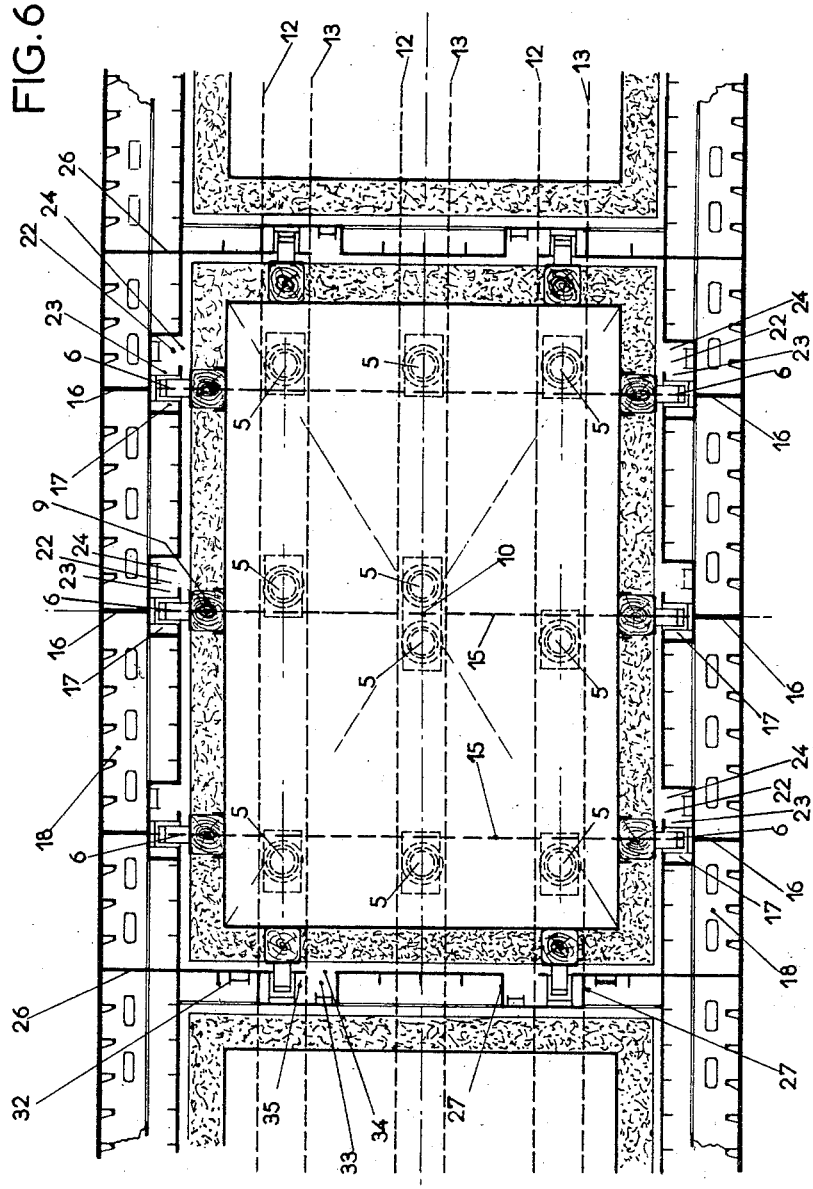

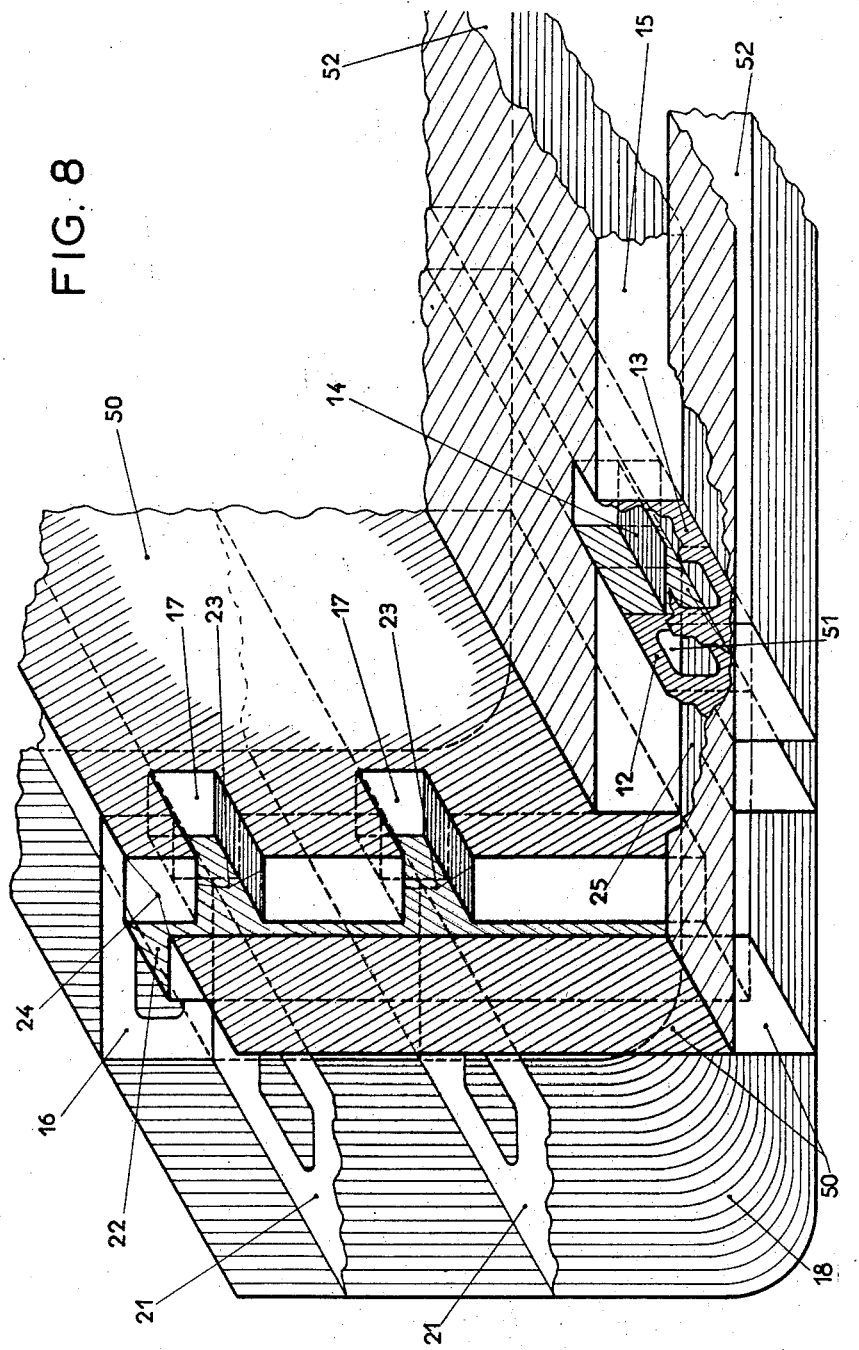

Jan. 1, 1963　　　　R. LEROUX　　　　3,071,094
VESSEL FOR TRANSPORTING LIQUEFIED HYDROCARBONS
Filed Oct. 22, 1959　　　　　　　　　　　　9 Sheets-Sheet 8
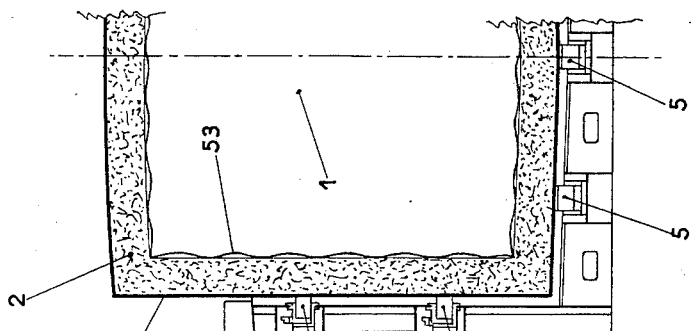
FIG. 9
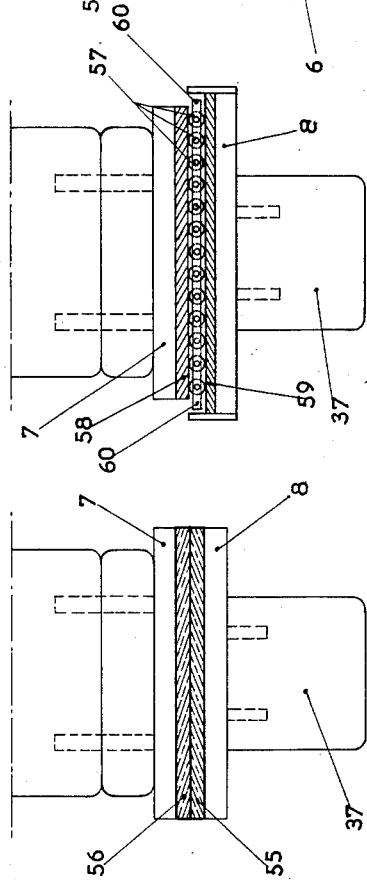
FIG. 10
FIG. 11
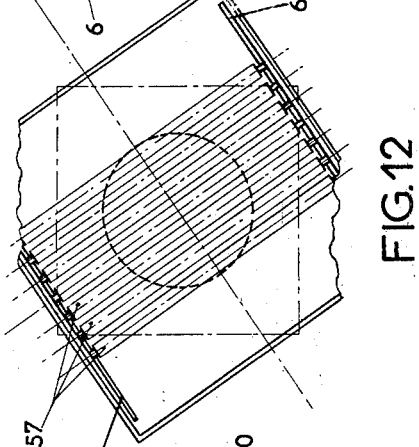
FIG. 12
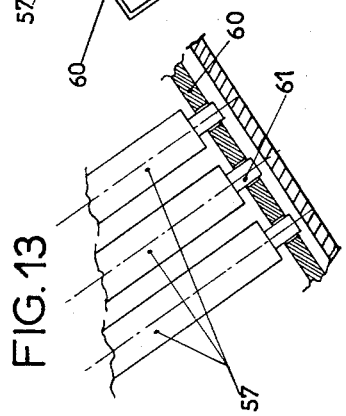
FIG. 13

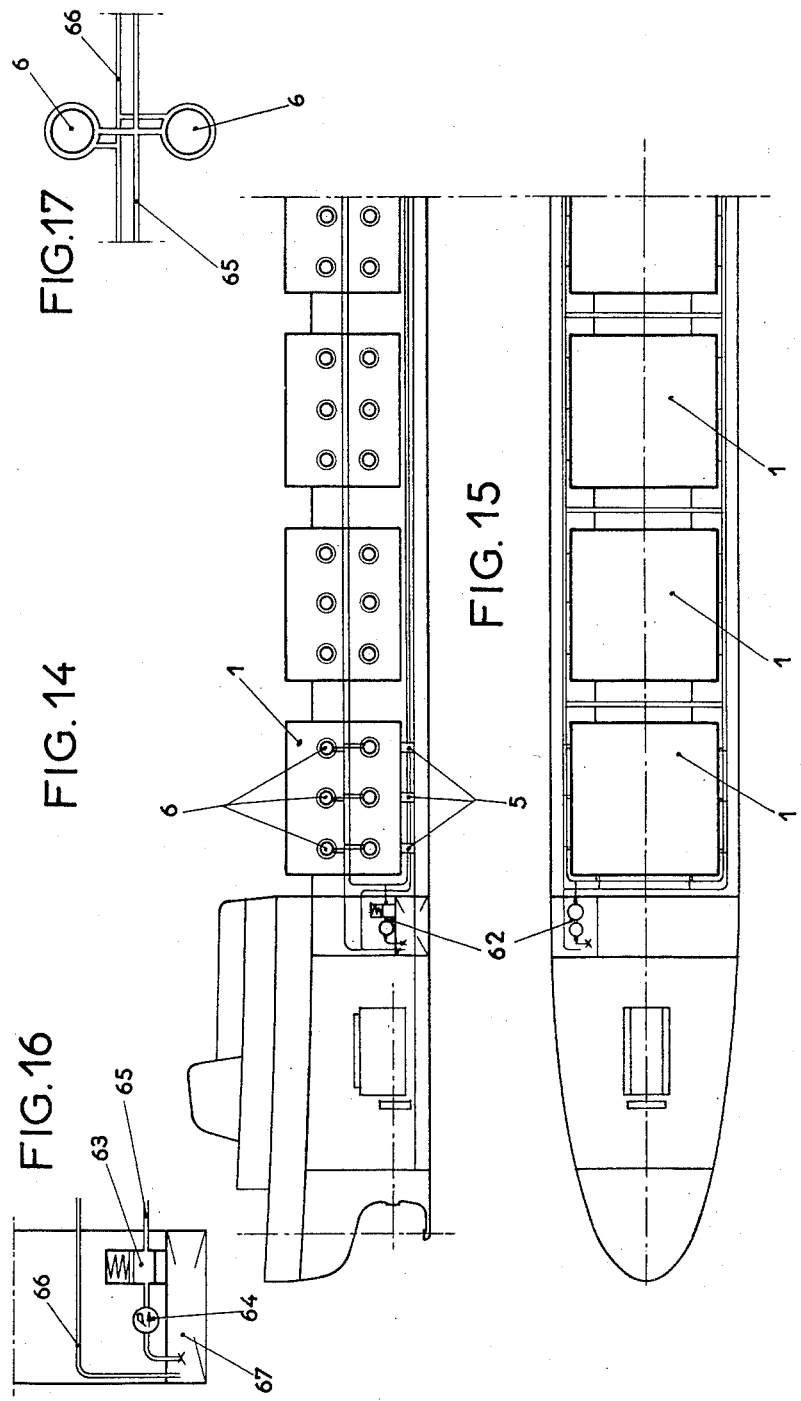

United States Patent Office 3,071,094
Patented Jan. 1, 1963

3,071,094
VESSEL FOR TRANSPORTING LIQUEFIED
HYDROCARBONS
René Leroux, Nantes-Chantenay, France, assignor of one-half to Société Anonyme des Anciens Chantiers Dubigeon, Nantes-Chantenay, France, a corporation of France
Filed Oct. 22, 1959, Ser. No. 848,112
Claims priority, application France June 2, 1959
7 Claims. (Cl. 114—74)

This invention relates to the storing and shipping of liquefied hydrocarbons and more particularly comprises improvements in the construction of those maritime vessels which transport liquefied hydrocarbons at very low temperatures.

It is well known that hydrocarbons, which are in a gaseous state in normal conditions of temperature and pressure, may be reduced to a liquefied state by high pressure or low temperature or a combination of both. Regardless of which system is used to store and transport liquefied hydrocarbons there are a number of difficult problems that are presented. For instance, the tanks used to store the liquefied hydrocarbons under pressure must be strong enough to resist the high pressures needed to liquefy the gas. The weight involved in such tanks is often objectionable because it comprises a substantial portion of the total weight of the vessel.

If low temperature is to be the medium for transporting the hydrocarbon in a liquefied state then problems of a different sort are encountered. In the case of methane a temperature of about −161° C. is required to achieve and maintain liquefication at the atmospheric pressure. At such temperatures ordinary steel becomes brittle, generally losing its mechanical qualities, and rendering it incapable of withstanding the stresses and strains to which the structural portions of a vessel are normally subject. The smallest leak in these tanks creates a contact between the transported product and shell plating, which is built in ordinary steel, and can possibly damage it, then create a leakage and therefore the loss of the vessel.

It will be realized that a ship's motion (rolling and pitching) creates considerable stress on longitudinal and transverse bulkheads. These stresses are due to a component of the gravity created by the ship's heeling and mainly to the orbitary movement of the swell which, by rough weather creates acceleration of inertia of approximately the same order as the acceleration of gravity. In case the ship is aground, considerable stress can then be transmitted to the bottom of tanks and this fact has to be prevented.

Further, tanks for liquefied hydrocarbons are subject to a certain definite amount of expansion and contraction occasioned by the wide variations in temperature to which they are subject. Bearing these points in mind it would be desirable to arrange the tanks within the vessel in such a fashion that they would not be rigidly connected to the structural portions of the vessel. It is also desirable that the tanks be firmly supported to prevent unwarranted movement and vibration thereof and mounted in such a fashion that the structural portions of the vessel are not subjected to the low temperatures within the tank. It is therefore necessary to secure the tanks to ship's bottom and sides providing a transmission of stress corresponding approximately to the weight of tanks when filled up with liquids without creating abnormal stress.

It is a general object of this invention to improve the storing and transporting of liquefied hydrocarbons at low temperatures.

Another object of this invention is to provide a maritime vessel for transporting liquefied hydrocarbon, the vessel having low temperature storage tanks generally following the contours of the vessel and supported in such a fashion as to allow for expansion and contraction of the tanks as well as flexing of the ship's bulkheads and structural members.

Yet another object of this invention is to mount a tank within a vessel in such a fashion as to constitute an aperiodic system.

One feature of this invention comprises the fitting out of a system of hydraulic jacks between the hull of the ship and the tanks. These jacks are disposed at various locations so as to support the tanks vertically, laterally and longitudinally. Another feature of this invention comprises a movable connection between the jacks and the tanks to compensate for the relative movement between the tanks and the vessel proper which together with the jacks prevent the transmission of abnormal stresses between the tanks and the vessel structure. Moreover, the invention comprises a jack running under a specified stress in the outward direction and under a higher and duly specified stress in the inward direction. Moreover, the installation is designed so that sliding movements created by thermal contraction are absorbed by a system of slides fitted in the direction of the expansion. In some cases, these slides can be replaced by ball or roller bearings.

Still another feature of this invention resides in the forming of a thermal insulating barrier between the tanks and the jacks to avoid subjecting the portions outside of the tanks to the low temperature.

Figure 1:
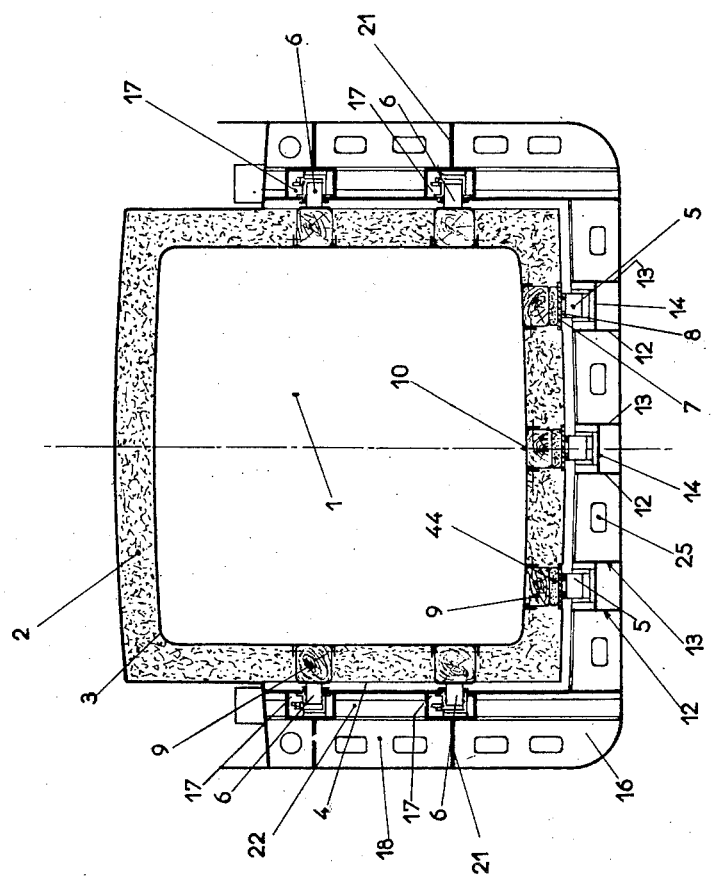
Figure 2:
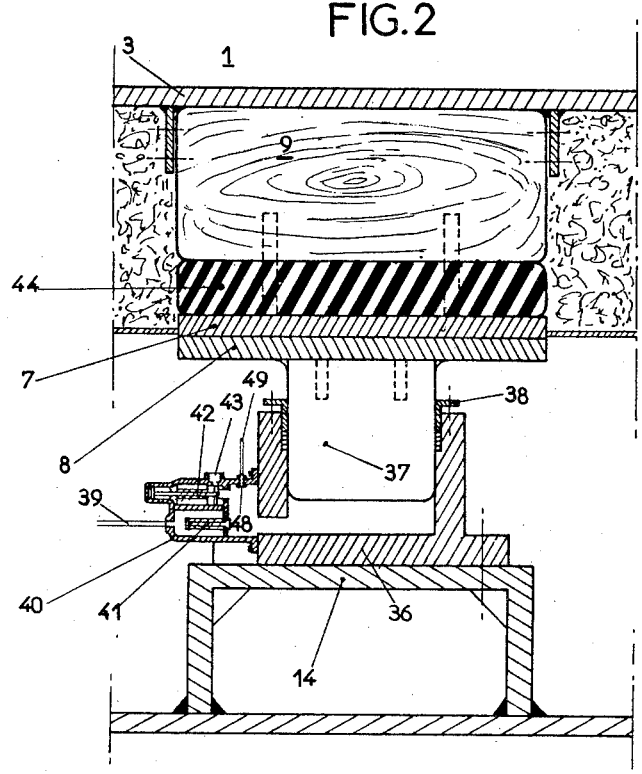
Figure 3:
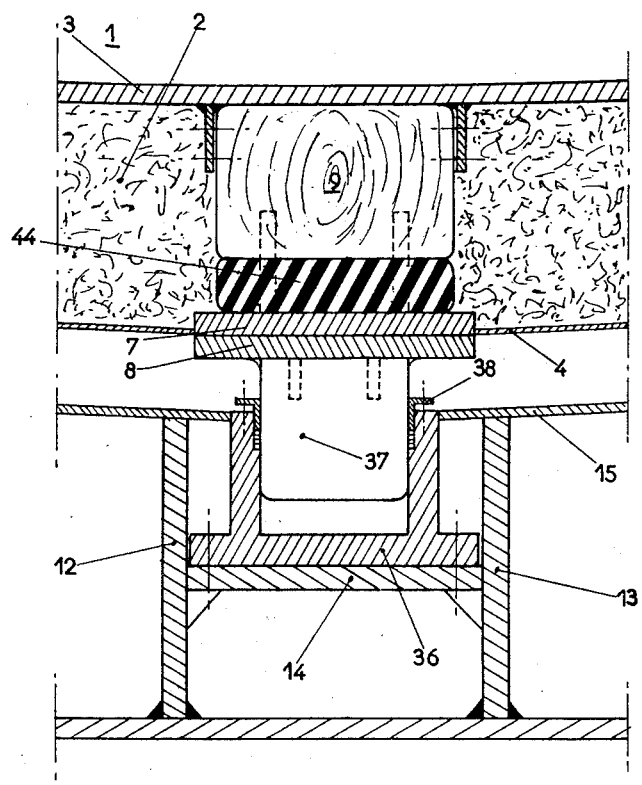

These and other features and objects will be more apparent upon a detailed description of the invention taken in conjunction with the accompanying drawings in which:

FIG. 1 is a sectional view in end elevation of a vessel made in accordance with this invention, FIGS. 2 and 3 are sectional views side and end elevation respectively showing details in the construction of the jacks seen fitted to the ship's bottom in FIG. 1, FIG. 4 is a sectional view in end elevation showing details in the construction of the jacks seen fitted to the side of the vessel in FIG. 1, FIG. 5 is similar to FIG. 4 but on a larger scale, FIG. 6 is a sectional plan view showing a portion of a vessel made in accordance with this invention, FIG. 7 is a sectional view in side elevation showing a portion of the vessel illustrated in FIG. 1, FIG. 8 is a detailed perspective view with certain parts being broken away showing the construction of the hull and the arrangement of trunks, passageways and recesses, FIG. 9 is a sectional view in end elevation of a modification of the device illustrated in FIGS. 2 and 3, FIG. 10 is a sectional view in side elevation showing in detail a modification of the device illustrated in FIGS. 2 and 3, FIG. 11 is a view similar to FIG. 10 but showing a further modification of the FIGS. 2 and 3 construction, FIG. 12 is a sectional plan view corresponding to the FIG. 11 embodiment, FIG. 13 is a detailed view corresponding to FIG. 12 but on an enlarged scale, FIG. 14 is a sectional view in side elevation of a vessel constructed according to this invention and including a schematic view of the hydraulic system, FIG. 15 is a sectional plan view corresponding to FIG. 14, FIG. 16 is a detailed view in side elevation somewhat schematic showing the compressor plant of FIGS. 14 and 15, and FIG. 17 is a view similar to FIG. 16 but showing the jacks with their associated piping.

Referring now to the drawings the reference character 1 indicates the chamber of a tank 3 suitable for containing a quantity of a liquefied hydrocarbon such as methane at low temperature. The walls of the tanks in this case are generally nearly parallelpipedic and conform as much as possible to the shape of the hold. In order to maintain the methane in a liquefied state the temperature of the methane at atmospheric pressure must be lowered to about −161° C. To maintain this extremely low temperature a thick layer of insulating material 2 is fitted about the tanks 3 with an outer protective metal sheet 4 covering the insulating material. Certain variations may be made in the construction of the insulated tanks. For instance in the embodiment illustrated in FIG. 9 the insulation may be applied to the interior of the tanks 54 and coated on its internal face with a thin sheet 53 of special liquid-proof metal. In this fashion the outside vessel which is constructed of ordinary steel, is not submitted to the effects of thermal contraction.

The tank 3 is preferably reinforced with stiffening frames (not shown) so that its bottom and sides are supported at a certain number of points. At these points, blocks of wood 9, equal in thickness to the insulating material 2, are secured to the rigid tank 3. Through these blocks the tank can lay on the pistons of a plurality of jacks located between the tank and the inner hull of the vessel. The jacks supporting the bottom of the tanks are indicated by reference character 5 in FIGS. 1 and 6 and are shown in detail in FIGS. 2 and 3.

These bottom jacks 5 are fitted in line between longitudinal girders 12 and 13 which constitute three coupled systems in the ship's bottom. Each one is mounted on a carling 14 and adjoining immediately a floor plate 15 built in a web frame 16. Fastening of the jacks with vessel is therefore particularly strong and they can withstand considerable stress. It is to be noted that the height of the decks leaves a passage under the tank for inspection of the condition of this tank and of the operation of the jacks.

Side jacks 6 are placed (FIGS. 1 and 6) in side recesses 17 which are located in the wing ballast tank 18 and watertight with respect to this tank. Thus, jack 6 can be supported (FIG. 4) on the web frame 16 composed of a flat portion 20 and base 21, through a wedge 19.

These side jacks 6 (FIGS. 1 and 6) are arranged in several vertical recesses 17, situated one above the other and, next to each group of recesses, a trunk 22, watertight with respect to the ballast tank, has openings 23 leading into the recesses 17 to permit access to the jack 6. The trunk 22 is also provided with opening 24 leading to the hold which contains the tank 3 to permit inspection of its side wall. The trunk 22 extends to the ship's bottom and offers an access to a lower compartment 25 (FIG. 1) whereby access may be obtained for examining the tank bottom and the bottom jacks.

By this arrangement it is possible to dismantle the side jack from its mounting. Once a wedge 19 has been removed then all other parts may be drawn out through the trunk. Dismounting of the bottom jacks 5 presents no problem since they can slide horizontally once their pistons have been retracted.

With respect to the jacks 30, 31, located on the side bulkhead 26, they are mounted in similar fashion between stiffeners 27 which are coupled in the same way on the bottom longitudinal keelsons. On the other hand, these jacks and supports have to be very strong to withstand all the stresses working in a longitudinal direction, and they are connected with the bottom keelson and deck girders through brackets 28 (FIG. 7).

By forming a recess 29 in the watertight bulkhead 26 watertight integrity is maintained while at the same time providing accommodation for the jacks 30. The jacks mounted on the opposite side of the bulkhead and facing in the opposite direction are fitted above the recess 29 as seen best in FIG. 7.

A trunk 33 is provided between adjacent tanks, extending bulkhead water tightness and offering access to the ship's bottom as well as to the jacks 30. This trunk has openings 34 and 35 to recesses 29 as well as to the tank side wall situated near the bulkhead. A ladder 32 is provided for personnel to reach the jacks 31.

Referring again to the jacks 5 supporting the bottom of the tanks, a pair of slide plates 7 and 8 (FIGS. 2 and 3) are provided between each jack and the tank. These slide plates allow for horizontal movement of the wooden blocks 9, secured to the tank 3, occasioned by thermal contraction of the tank. Therefore the slides have no effect on the center of deformation 10 (FIGS. 1 and 6) which is placed near the center of gravity of the tank bottom. The slide plates are required only on the bottom and along the sides and connected in such a manner that displacement follows a line which goes through the center of expansion. If desired suitably lubricated brass plates 55 and 56 (FIG. 10) may be interposed between the slide plates 7 and 8. Ball or roller bearings (FIGS. 11, 12 and 13) may be substituted if the side of the tank permits it. In this modification a plurality of roller bearings 57 may be arranged in parallel relation between bearing plates 58 and 59 with the roller end portions 61 mounted in spaced brackets 60.

It will be noted also that the wooden blocks 9 (which may be of oak) resting on the side jacks also permit a small sliding movement at the time of thermal deformation, the transmitted stress being relatively weak when the liquid is introduced at low temperature since at that time the ship will be moored in port where the sea is calm. This sliding movement is absorbed by friction of a brass plate 11 (FIG. 4) fastened on the wooden piece 5, against the steel piston head 37 of the jack.

FIGS. 2 and 3 illustrate details in the construction of the bottom jacks 5 which are generally stronger than the side jacks 6, 30 and 31 since they support most of the weight of the tank. Each jack 5 comprises a body section 36 having a cylindrical chamber formed therein to accommodate a piston 37. A gland 38 is provided to form an oil tight seal between the piston and the body section. Hydraulic oil is introduced to the jack via a conduit 39 to a manifold 40.

The manifold houses a non-return valve 41 discharging to the cylinder. A relief valve 42, set to lift at a pressure higher than the pressure required to operate the non-return valve 41, is mounted on the manifold and discharges to a return outlet 43.

The operation of the jack is governed by a self-acting hydraulic plant 62 (see FIGS. 14, 15 and 16) including a pump 64, an accumulator 63 for maintaining hydraulic pressure at a specified value, and a supply line 65 leading to the jacks with a return line 66 leading to a sump 67. The slide plates 7 and 8 are arranged on the upper end of the piston and bear against the wooden block 9 through an intermediate plastic member 44, made for example of hardened rubber plate or any similar material.

The side and transverse jacks (FIGS. 4 and 5) are built in a similar manner, with the exception that they have a flexible cushion 45 fitted about the exposed portion of the jack so as to prevent accidental contact between the tank wall and the gland 38. The stroke of the piston 37 is also limited by a shoulder 46 extending from the side of the piston into a recess 47.

The operation of the system is as follows: firstly the hydraulic plant 62 is started to place the jacks under pressure. This causes the pistons of the bottom jacks to rise about 10 cm., for example, and support the tank. The pistons of the side jacks come into contact with the tank and hold it in position with a moderate effort. When the low temperature liquid is brought on board the tank will contract, but because of the arrangement of the sliding connection between the jacks and the tanks, no tension will be created.

When the ship is underway the jacks will hold the tank in position despite normal movements due to rolling and pitching of the vessel. Should the seas become rough and cause a violent rolling motion the pressure of the tank against the jacks may cause some of the relief valves to lift. The retraction of the pistons which follows the lifting of the safety valves will produce of slight inclination of the tank. The pistons of all other jacks will follow in contact with the tank by projecting outwards where necessary. As soon as the excessive pressure is reduced the relief valves close and the tank will remain in its new position until conditions become such as to cause the safety valves of the same or other jacks to lift. When this takes place the tank will assume a new position.

Normally, every movement of the tank is opposite to the preceding one, but between each movement there is sufficient delay as to prevent the possibility of resonance or of dangerous vibration. In any event this movement is very small since the clearance of the side piston is limited to about 4 cm. On the other hand, the bottom pistons have a clearance of about 10 cm.

In the event of a very strong impact against the ship's bottom, as would happen in a grounding, pressure rises in the bottom jacks and the relief valve lifts. The stress of the impact is not transmitted to the tanks but is absorbed by the piston retracting into its cylinder.

Should the deflection created by this impact exceed 10 cm. the end of the piston will rest on the base, but the tanks will still be protected by the plastic member 44 which will flatten under the pressure.

In some installations it may be desirable to have some of the bottom jacks and some of the side jacks in communication with one another in order to insure a better distribution of stresses on the bottom and side walls of the tank. In such a case each jack is provided with an inlet 48 and a pipe 49 generally of a small diameter whereby pressure between the several units may be balanced. By way of example, all the bottom jacks may be in communication with one another or only those in rows may be so arranged. Also it may be preferable to communicate all jacks mounted at the same level, on the ship's side and transverse bulkhead. This will result in a better distribution of stresses, greater smoothness in tank movements inside the hull, together with a better absorption of these movements close to the small diameter of the communicating pipes.

Tanks which have their interior walls insulated may be mounted in a similar manner but the slide plates and wooden blocks may be omitted.

From what has been said it will be appreciated that a tank mounted in a vessel incorporating these novel features may freely expand and contract without creating an abnormal stress either in the tank or in the hull. Also violent stresses caused by impacts to the hull will not be transmitted to the tank.

It will also be apparent that a great many modifications may be made by those skilled in the art without departing from the spirit of my invention.

Having thus disclosed my invention what I claim and desire to obtain by Letters Patent of the United States is:

1. A ship for transporting liquefied hydrocarbons at a low temperature comprising an outer hull, an inner hull spaced from said outer hull and defining ballast chambers therebetween, a tank adapted to contain said liquefied hydrocarbons disposed within said inner hull, a plurality of hydraulic jacks mounted on the bottom and sides of said inner hull and supporting said tank, said jacks being provided with pistons in contact with said tank and being adapted to extend and retract as required to accommodate bodily movement of said tank relative to said inner hull, an hydraulic fluid pump having an inlet and an outlet, conduit means for communicating the outlet of said pump with said jacks for applying a feed pressure thereto, non-return valve means interposed in said conduit means for preventing return flow of fluid from said jacks therethrough, return conduit means for communicating said jacks with the inlet of said pump, and relief valve means interposed in said return conduit means for limiting the pressure in said jacks to a predetermined valve in excess of said feed pressure.

2. A ship according to claim 1 wherein said jacks are slidably connected with said tank to permit expansion and contraction of said tank.

3. A ship according to claim 1 wherein said tank is lined with thermal insulating material.

4. A ship according to claim 1 wherein selected ones of said jacks are hydraulically connected, whereby the pressure between said jacks may be balanced.

5. A ship according to claim 1 wherein said inner hull is contoured to define recesses for said jacks and passageways communicating with said recesses and extending about said tank to permit inspection of said jacks in said tank.

6. A ship for transporting liquefied hydrocarbons, comprising an outer hull, an inner hull spaced from said outer hull and defining ballast chambers therebetween, at least one thermally insulated tank disposed within said inner hull, said tank being adapted to contain a quantity of liquefied hydrocarbons at very low temperatures, a plurality of hydraulic jacks mounted along the bottom and side walls of said inner hull and supporting the bottom and side walls of said tank, said jacks being adapted to retract or extend as required in response to a component of motion of said tank, an hydraulic fluid pump having an inlet and an outlet, conduit means for communicating the outlet of said pump with said jacks for applying a feed pressure thereto, non-return valve means interposed in said conduit means for preventing return flow of fluid from said jacks therethrough, return conduit means for communicating said jacks with the inlet of said pump, and relief valve means interposed in said return conduit means for limiting the pressure in said jacks to a predetermined value in excess of said feed pressure, said jacks constituting an aperiodic system.

7. A ship for transporting liquefied hydrocarbons, comprising an outer hull, an inner hull spaced from said outer hull and defining ballast chambers therebetween, at least one thermally insulated tank disposed within said inner hull, said tank being adapted to contain a quantity of liquefied hydrocarbons at very low temperatures, a plurality of hydraulic jacks mounted along the bottom and side walls of said inner hull and supporting the bottom and side walls of said tank, said jacks being adapted to retract or extend as required in response to a component of motion of said tank, and an hydraulic pump system connected to supply pressurized hydraulic fluid to said jacks, said jacks being provided with non-return fluid inlet valve means, and fluid pressure relief valve means whose working pressure is selected to limit the stress applied to the walls of said tank.

References Cited in the file of this patent

UNITED STATES PATENTS

| | | |
|---|---|---|
| 956,810 | Lamasney et al. | May 3, 1910 |
| 2,244,782 | Jones | June 10, 1941 |
| 2,520,883 | Kornemann et al. | Aug. 29, 1950 |
| 2,700,458 | Brown | Jan. 25, 1955 |
| 2,889,953 | Morrison | June 9, 1959 |
| 2,896,416 | Henry | July 28, 1959 |
| 2,905,352 | Henry | Sept. 22, 1959 |
| 2,920,850 | Campbell | Jan. 12, 1960 |
| 2,992,622 | Maker | July 18, 1961 |

FOREIGN PATENTS

| | | |
|---|---|---|
| 91,767 | Norway | May 27, 1958 |
| 220,768 | Australia | Oct. 2, 1958 |